United States Patent [19]

Roullet

[11] 4,267,143

[45] May 12, 1981

[54] PROCESS FOR THE MANUFACTURING OF BIORIENTED HOLLOW BODIES

[75] Inventor: Gilbert Roullet, Tremblay les Gonesse, France

[73] Assignee: Rhone-Poulenc Industries, Paris, France

[21] Appl. No.: 10,218

[22] Filed: Feb. 8, 1979

[30] Foreign Application Priority Data

Feb. 13, 1978 [FR] France .................................. 78 03938

[51] Int. Cl.³ .............................................. B29C 17/07
[52] U.S. Cl. ...................................... 264/516; 215/1 C; 264/512; 264/513; 264/515; 264/134; 428/35; 428/483; 428/522; 428/910
[58] Field of Search .............. 264/512, 513, 515, 516, 264/134, 129, 230; 215/1 C; 428/35, 483, 522, 910; 427/171, 385 B

[56] References Cited

U.S. PATENT DOCUMENTS

| | | | |
|---|---|---|---|
| 2,860,801 | 11/1958 | Nielsen | 427/385 B X |
| 3,505,264 | 4/1970 | Thoese et al. | 427/385 B X |
| 3,733,309 | 5/1973 | Wyeth et al. | 264/540 X |
| 3,901,755 | 8/1975 | Martin et al. | 428/483 X |
| 4,066,820 | 1/1978 | Kelly et al. | 428/483 |
| 4,079,850 | 3/1978 | Suzuki et al. | 264/515 X |
| 4,127,633 | 11/1978 | Addleman | 264/134 X |

Primary Examiner—Jan H. Silbaugh
Attorney, Agent, or Firm—McDougall, Hersh & Scott

[57] ABSTRACT

The invention pertains to the manufacture of hollow bodies such as bottles for packaging pressurized or flavoring liquids by a blowing process according to which a preform of a polyester with a polyvinyl alcohol coating is used.

17 Claims, No Drawings

PROCESS FOR THE MANUFACTURING OF BIORIENTED HOLLOW BODIES

The present invention relates to a process for obtaining polyester bioriented hollow bodies manufactured by blowing from a preform and it relates more particularly to a process for obtaining bioriented polyester hollow bodies which are gas and flavor impervious.

In the field of hollow bodies, polyesters have rapidly developed in recent years. In particular, ethylene polyterephtalate, by a biorientation-blowing process of preforms, has shown a remarkable aptitude for fabrication of bottles with excellent mechanical properties (notably shock resistance and resistance to internal pressure), allowing for their advantageous usage in the packaging of pressurized liquids and carbonated beverages. However, occasionally, when dealing with highly flavored liquids and/or oxygen sensitive liquids and/or carbonated liquids, the packaged product is deficient from the standpoint of preservation where the polyterephtalate hollow bodies are not sufficiently gas or flavor impervious. This is even more so when the body wall is thin and when the ratio of the surface of the receptacle to the volume of the contents is significant.

To reduce hollow body permeability, it has previously been proposed to coat the surfaces with a "barrier" material having less permeability to gases than that of the substrate.

According to known processes, the coating can be applied either on the finished receptacle or on the preform; the various techniques include coextrusion, moulding from a casting, and the coating processes of soaking, pulverization, etc. The first two techniques require complex, costly equipment. The primary drawback of coating by soaking or pulverization on the finished product is that, due to the geometry of the receptacle, it is difficult to control the thickness of the deposited layer; furthermore, if polyvinyl alcohol is used as the barrier material, the coating is known to be very water sensitive; it is known that under very moist conditions, polyvinyl alcohol polymers have the drawbacks of not remaining impervious to oxygen and of being sensitive to streaks and stains. Coating by soaking or pulverization at the preform stage has been proposed on various substrates such as vinyl polychloride, polyolefins, polycarbonates and polyamides by using a latex of vinylidene polychloride (Belgian Pat. No. 803 139). In practice, the use of vinylidene polychloride involves the application of several successive layers with intermediate drying after each layer because, in the case of a thick layer, the surface film prevents the drying of lower layers and can result in delamination.

The present invention pertains to a process for the preparation of bioriented polyester hollow objects rendered gas and flavor tight or impervious by means of a polyvinyl alcohol coating of uniform thickness.

According to the invention, this is achieved by a coating process according to which at least one layer of polyvinyl alcohol in aqueous solution is deposited on at least one wall of a polyester tube or preform, the coating is dried, after which the preform is drawn and blown in a mould at the orientation temperature of the polyester in order to obtain a hollow body with at least one wall covered with a bioriented, adherent film of polyvinyl alcohol.

The polyester constituting the base substrate is a glycol polyterephtalate. Polyethelene terephtalate (including homopolymers and copolymers consisting of small quantities of other diol and/or triol and/or diacid units) is a particularly interesting material; its intrinsic viscosity (measured in ortho-chlorophenol) is preferably between 0.60 and 1.2 dl/g.

The preform can be obtained directly or indirectly from an extruded tube or by any known means such as injection, injection-blowing, extrusion-blowing, compression or transfer. For the sake of simplicity, the term preform is used, whether dealing with a finished preform (closed end and formed neck) or a blank such as a tube section.

The polyvinyl alcohol aqueous solution can be applied on the preform using any appropriate method, for example, soaking, coating with a blade or an air doctor, pulverization, sprinkling, etc. Alternately, the coating can be applied directly at the time of tube extrusion, after leaving the drawplate, in which case the tubes are then dried and cut to the desired length, eventually stored, before being transformed into preforms. It is best that the coating be applied at a temperature between 40° and 60° C.

Gas and vapor tightness of the coating is a function of the thickness of the coat on the finished product and of the nature of the polyvinyl alcohol. To obtain good non-polar gas tightness, it is preferable to choose products obtained from vinyl polyesters containing at least 90% and preferably more than 97% of vinyl alcohol moieties, vinyl polyesters can be represented in particular by vinyl polyacetates and their copolymers rich in acetate, such as acetate copolymers of vinyl-ethylene consisting of less than 10% ethylene unit. Products such as these are available on the market. Although high molecular weight polyvinyl alcohols display maximum tightness, especially in a moist atmosphere, their usage may cause solution difficulties, resulting in the necessity of having to deposit several coats successively in order to obtain a sufficiently thick final coating. A good compromise is to use a polyvinyl alcohol with an ester index between 2 and 150, preferably lower than 20, and a viscosity (measured in solution at 4% in water) of less than 20 cp and more specifically between 2 and 10 cp. The polyvinyl alcohol concentration in the solution is generally between 5 and 25%. The solvent can either be water alone, or a mixture of water and hydrosoluble adjuvants with boiling points lower than 150° C., such as ethyl or methyl alcohols, possibly having small amounts, generally less than 5%, of other hydrosoluble agents with high boiling points, such as glycerol or glycol ethylene. It is therefore easy to deposit amounts (grammages) of more than 30 g/m2 in a single coat, which can suffice in some applications. It is also possible to apply the coating in several successive layers by using one single composition or different compositions. For example, the first coat may consist of a low molecular weight polyvinyl alcohol with a fairly high ester index, with the second coat consisting of a polyvinyl alcohol with a very low ester index and a higher molecular weight.

The polyvinyl alcohol solutions may, of course, contain various adjuvants such as emulsifiers, plasticizers, cross-linking agents, bactericides, fungicides, anti-static agents, slip agents, loading agents, colorants, pigments and cross-linking agents.

To facilitate moistening and consequently coating adhesion, it is suggested, depending on the nature of the substrate and that of the coating layer, to treat the surface of the polyester beforehand, for example, by the Corona effect or by application of a flame directly onto the surface and/or to reduce the surface tension of the polyvinyl alcohol solution by incorporating surface-active agents.

The drying time and drying intensity of the polyvinyl alcohol deposit(s) should be selected so as to avoid any danger of softening and/or premature crystallization of the base polyester and under such conditions that the polyvinyl alcohol coating can then be drawn without cracking or delaminating, all this while acquiring a crystalline, bioriented structure favorable for obtaining improved physical and mechanical properties. It is preferable to maintain a residual moisture content of more than 0.01%. A practical production method consists in a partial drying so that the moisture content is relatively high, for example, between 0.5 and 5%. The final drying can be carried out at any stage after bidrawing, for example, after the hollow body has been shaped. Drying means which preferably heat the surface of the coating can be advantageously used, for example, a blast of air at a high temperature for a short time or an infrared ray of determined wave length.

The coating can subsequently be improved in a variety of ways. The first improvement consists in subjecting the polyvinyl alcohol coat after bidrawing to heat treatment above 100° C., and preferably between 150° and 240° C. This can be done, for example, by blowing the hollow body in a mould, the walls of which, corresponding to the most drawn parts of the bottle, are heated to more than 100° C. and by keeping the hollow body walls in contact with the mould walls by means of fluid internal pressure. A variation consists of a post heat treatment on the outer coating of the bottle, after its removal from the mold and preferably after filling, carried out by a blast of hot gas or by an infrared ray for a short period of time. The post heat treatment at the indicated temperature interval promotes coating crystallization and the internal dehydration of polyvinyl alcohol and is particularly recommended for an alcohol with a low ester index. This result can be reinforced by incorporating small quantities of cross-linking agents, such as glyoxal or melamine-formaldehyde resins into the alcohol.

In certain cases, and especially when the bottles are to be subjected to extreme moisture conditions, it is desirable to protect the polyvinyl alcohol layer with a second coating which is less sensitive and less permeable to moisture. Coating by this second polymer can be carried out as above, either on the preform or directly on the extruded pipe, for example, by means of a moisture tight polymer latex or by encasing by a melted polymer. As examples of latex, these can all be used advantageously: latexes of polystyrene, styrene-butadiene or styrene-acrylate copolymers, vinyl polyacetate, vinylidene chloride copolymer or homopolymer. As melted polymer, we can use a polyester, which eventually will be the polyester of the substrate, or an ionomer resin, or a low density polyethylene, an ethylenevinyl acetate copolymer with low acetate content, a polyamide, a vinylidene chloride polymer or copolymer. According to a preferred production method, the coating process is carried out on the tube itself, the second coat being applied by continuous coextrusion-coating with a melted polymer. This process can be carried out, for example, with a circular drawplate coaxial to the tube coated with polyvinyl alcohol and fed by an attached extruder.

Alternately, the coating protected with a moisture tight polymer can be applied on the finished hollow body after biorientation-blowing. The classical coating techniques of coating in layers can be applied. Also, in a production method of the process of the invention, a drawable or retractable sleeve can be placed on the bottle, this operation being able to be carried out on a bottling assembly line, before or after filling. The sleeve can be produced by cutting a casing crosswise obtained either by extrusion-inflation (most common case for low density polyethylene, polypropylene, ethylene-vinyl acetate, ionomer resin and acrylonitrile copolymer casings) or from a flat film which is rolled and fused or glued (case for PVC or vinylidene polychloride). The sleeve may, of course, contain various adjuvants, notably colorants and UV absorbants, and it can be transparent or opaque, patterned or not. It is not necessary for the sleeve to cover the entire bottle surface. Depending on the type, except for the bottom and neck, only the straight, cylindrical part can be protected.

The process according to the invention, in which a polyester preform which has been coated with at least one polyvinyl alcohol layer, which is then bidrawn-blown at the same time as the base polymer, produces hollow bodies which have advantageous characteristics when compared to bioriented polyester hollow bodies which are either uncoated or coated after blowing. The main advantages of the bioriented, semi-crystalline structure of the coating obtained according to the process are increased resistance to streaking due to friction, reduced risks of staining especially with high moisture, lessening of the tendency of polyvinyl alcohol to lose its gas-tightness properties in a very moist atmosphere, improved appearance and finally greater adhesion to the substrate.

The hollow bodies produced maintain the characteristics of polyester hollow bodies with regard to compressive strength, brilliancy and transparency. They have the advantage of being gas and flavor tight or impervious which allows them to be used advantageously for the bottling and preservation of food products, such as carbonated drinks and fruit juices.

Following are production examples of the invention given for illustrative and non-limitative purposes. In every example, oxygen permeability is measured in $cm^3-cm/cm^2-s-cmHg$.

EXAMPLE 1

A polyester tube with an outer diameter of 24.8 mm, made of glycol ethylene terephtalate with an intrinsic viscosity measured in ortho-chlorophenol of 0.82 dl/g, is extruded at the outlet of a polycondensation reactor. By means of a gear pump with a discharge pressure of 300 bars, the melted polymer is advanced through a 4 inch, 10 component static mixer (brand ROSS) equipped with a double casing for heat-carrying fluid flow regulated at 240° C., and then through a punch-drawplate assembly 30 to 40 mm in diameter. At the drawplate outlet, the extrusion product enters a Kanfman type, water cooled mandrel and is flow-coated and then drained over a vat containing an aqueous solution of 15% polyvinyl alcohol (brand RHODOVIOL 4-20 of RHONE-POULENC) maintained at 50° C., constantly resupplied and sprayed on the tube by a pump equipped with two groups of 6 nozzles arranged in a crown around the tube and spaced at 20 cm from each other. After draining, the tube passes over a crescent-shaped metallic pre-scraper with an inner diameter of 26 mm, and then through 2 circular air doctors centered on the axis of the tube, delivering warm air at 40° C. under 0.15 bar and 60° C. under 0.3 bar, respectively. The tube then goes through a one meter long radiant panel furnace which progressively raises the temperature from 60° to 105° C., and finally, it is sent into a drawing and cutting device where it is cut to 160 mm long sections. The tube sections thusly coated at the rate of 30 g/m2 with polyvinyl alcohol, the residual moisture content of which is 0.1 to 0.2%, are used to make preforms which are bidrawn-blown at 95°–115° C. into 1.5 liter bottles on a CORPOPLAST BAB 3 machine. The coating thickness in the straight cylindrical part of the bottle is 2.5μ.

On the most highly drawn part of the bottle, oxygen permeability is measured at 40° C. in air with 45% relative humidity and compared to that of a bottle manufactured from an uncoated extruded tube under the same conditions.

| According to the example | $0.35 \times 10^{-12}$ |
| --- | --- |
| Comparative sample | $5.8 \times 10^{-12}$ |

The brilliancy and transparency of the coated bottle is comparable to that of the uncoated bottle.

EXAMPLE 2

A preform 160 mm long, with an outer diameter of 24.8 mm and a wall thickness of 2.5 mm, is injection moulded. The polymer used is a homopolymer of glycol ethylene polyterephtalate with an intrinsic viscosity of 0.8 dl/g (measured at 25° C. in solution at 1% in orthochlorophenol). After Corona treatment, the preform is coated by immersing it all at once for 10 seconds in a vat containing a 17% polyvinyl alcohol solution (brand RHODOVIOL 4-20 of RHONE-POULENC) maintained at 50° C. After draining, the preform is dried by passing through a double row of radiant panels, then a hot air blast at 100° C. The preform coated at the rate of 35 g/m2 is transformed into a 1.5 liter bottle by heating to approximately 90° C., drawing and blowing in a mould. The thickness of the coating is 3.5μ. After filling with a fruit drink, the bottle is passed in front of an infrared ramp raising the outer coating temperature to 190° C. for a few seconds.

Oxygen permeability at 40° C. and 45% relative humidity $= 0.6 \times 10^{-12}$

Uncoated comparative sample bottle $= 5.6 \times 10^{-12}$

EXAMPLE 3

Preforms for 1 liter bottles, made of glycol ethylene polyterephtalate with an intrinsic viscosity of 0.8 dl/g, weighing 44 g, designed for beer packaging, are injection moulded. The preforms are 160 mm long with an outer diameter of 24.8 mm; they have an inner conical part with a 1 degree slope and a neck for bottle cap INE 29.

A loading device places the preforms on conical pins. Each preform-pin assembly then moves in line toward a distributor which places them at regular intervals on a conveyor belt with a continuous travel of 5 meters/minute, driven by a serrated wheel. A belt-pulley assembly causes the preforms to rotate. The preforms pass between two rows of Corona treatment oblique electrodes. They are turned over and dipped into a stationary vat containing an aqueous solution with 15% polyvinyl alcohol (Brand RHODOVIOL 30-5 of RHONE-POULENC) and 0.5% melamine-formaldehyde resin (Brand ACCOBOND of American Cyanamid). The bath temperature is maintained at 45°±5° C. The preforms are immersed at a depth of 145±2 mm. After the bath, the preforms are drained over a vat by natural gravity and by passing in front of an oblique air doctor. Then, for 1 minute, they enter a furnace consisting of a double row of radiant panels and a hot air ventilator; this allows the coating to be heated to a temperature of 100° C., while the core of the preform does not exceed 70° C. They are immediately taken and heated to 115° C. without leaving their pin, then are transferred to a blowing machine where they are bioriented at a rate of 2800 bottles/hour by blowing in a mould heated to 130° C., contact with the mould walls being maintained for 10 seconds by internal pressure.

Within 4 hours, the moisture recaptured at 20° C. and 65% relative humidity is 5%, instead of 7.8% if the melamine-formaldehyde cross-linking agent is omitted.

A practical taste test after 3 months at 20° C. shows that the organoleptic characteristics of beer bottled in this type of proofed bottle have not appreciably changed. However, there is clearly a difference in taste after 4 weeks at 20° C. with an unproofed bottle of equal thickness.

Furthermore, the beer which contained 3 volumes of $CO_2$ at bottling time loses only 4% of this gas at the end of this time period at 20° C., as against a 12% loss for a comparison sample bottle.

EXAMPLE 4

At a speed of 7.50 m/min, a glycol ethylene polyterephtalate tube (homopolymer with intrinsic viscosity I.V. OCP=0.83 dl/g) with an outer diameter of 24.8 mm and a thickness of 2.6 mm, is extruded at the outlet of a polycondensation reactor, using as base materials terephtalic acid and glycol ethylene.

The extrusion drawplate is preceded by a ROSS 12 component static mixer, which progressively and homogeneously lowers the temperature of the melted product from 278°±5° to 234°±2° C. without crystallization. A gear pump has been inserted upstream of this mixer which allows for very good uniformity of polymer flow.

The tube, once conformed and cooled, is coated in a single pass with a 25 micron layer of polyvinyl alcohol by passing in a bath of 15% RHODOVIOL 4-20 dissolved in water, then dried by an infrared ray tunnel furnace.

Then, the coated tube goes through the hollow punch of an extrusion-coating drawplate, its circular clearance having an average diameter of 32 mm and a width of 0.5 mm. This drawplate is supplied at a right angle by a small FAIREX plastic coating machine with a 25 mm screw, with an output of 6 kg/h of glycol ethylene polyterephtalate (homopolymer with intrinsic viscosity of 0.6 to 0.7 dl/g, consisting partly of polyester wastes of $(\eta) = 0.85$ recycled after grinding, without intermediate drying). The speed of polyester casing is approximately one-fifth of that of the tube. The casing is gripped by the tube and becomes adhered thereto and is stretched, producing a protective layer with an average thickness of 78 microns. Before being glued to the tube, it is maintained by a slight air depression.

After cooling by passing in a vat of cold water, the tube is cut into sections 180 mm long, which are used to make preforms for 1.5 liter bioriented bottles designed for bottling fruit drinks.

Oxygen permeability is measured after 2 months of storage at 25° C. and 60% relative humidity and it is compared with a polyester bottle manufactured under the same conditions (a) from an uncoated tube, (b) from a tube coated with a single layer of polyvinyl alcohol.

| Bottle according to the example | $0.8 \times 10^{-12}$ |
|---|---|
| Bottle (a) | $6.1 \times 10^{-12}$ |
| Bottle (b) | $2.5 \times 10^{-12}$ |

EXAMPLE 5

Polyester preforms (length 180 mm-weight 59 g) injection moulded from a homopolymer of glycol ethylene terephtalate with an intrinsic viscosity of 0.84 dl/g, are used. The preforms are coated with a layer of polyvinyl alcohol (RHODOVIOL 30-5) at the rate of 24 g/m2 and with a SOLVAY vinylidene chloride copolymer base protective outer layer (IXAN WA 35). This double coating is carried out continuously on a conveyor-belt machine equipped with pins on which the preforms are fitted. The preforms pass between two rows of Corona treatment electrodes which increase the critical surface tension of their outer surface from 37 to 52 dynes/cm. They then go into a first vat maintained at 45° C. containing an aqueous solution of 12% polyvinyl alcohol and 0.5% melamine-formaldehyde resin (ACCOBOND). The coating is partially dried for 5 seconds in a furnace with radiant panels and cross current hot air circulation which raises the surface temperature to 140° C.

The preforms coated with their first coat then briefly go into a short second vat containing IXAN WA 35 at 40°, the surface tension of which is 40 dynes/cm; they then go into a furnace equipped with two heating zones; in the first zone, the coating is gradually heated to 135° C. for approximately 1 minute; then in the second zone, the coating is maintained at 95° C. for 15 seconds.

At the end of the line, the coated preforms can either be ejected from their pins after cooling by air blast to be stored, or they can be immediately taken by the carrousel of a biorientation machine to be transformed into 1.5 liter capacity bottles.

These bottles are filled with a fruit soda containing 3.4 volumes of $CO_2$, the only additive being ascorbic acid (vitamin C). The preservation time can be as long as 8 months at 25° C. or 2 years at 5° C.

EXAMPLE 6

1.25 liter capacity polyester bioriented bottles, with smooth cylindrical walls, for soda containing 2.8 volumes of $CO_2$, are manufactured. These bottles are produced from threaded neck preforms injected with 50 g of polyvinyl alcohol coated on the outside as a 25 micron layer. This coat is deposited by vertical immersion up to 30 mm from the rim of the neck in a solution of 17% RHODOVIOL 4-20 in water, then dried; these operations are carried out on the continuous conveyor belt machine seen in Example 4.

The coated preforms are transformed into bottles on two Cincinnati RHB V biorientation-blowing machines, each of them with an output of 2500 bottles/hour. The bottles are taken by a bottling assembly line on which is inserted an automatic "FLIP-ON 3" machine ("POTDEVIN MACHINE Co" U.S.A.) designed for placing protective drawable sleeves having a thickness of 30μ. This machine is fed by a spool of precut, extruded-blown drawable casing made of vinyl acetate-ethylene copolymer. Each sleeve is separated from the next, opened, then enlarged by drawing and placed vertically on the bottle, held for approximately 1 second under the loading head. The sleeve then slowly retracts itself and covers the coated cylindrical part of the bottle, spilling slightly over the neck and bottom.

After filled with soda, a paper label is glued to the sleeve of the bottle thusly proofed.

The soda so packaged meets the minimal requirements for 6 months preservation at room temperature.

I claim:

1. Process for producing polyester bioriented hollow articles, comprising depositing at least one layer of polyvinyl alcohol on at least one wall of a polyester tube or preform, drying the deposited layer, and then drawing and blowing the preform in a mold at the orientation temperature of the polyester whereby the adhesion of the polyvinyl alcohol layer to the polyester base is increased and the gas tightness is increased by reason of crystallization of the polyvinyl alcohol during the drawing and blowing step to form the bioriented hollow structure.

2. The process as claimed in claim 1, in which the polyvinyl alcohol contains at least 90% vinyl alcohol moieties and is characterized by an ester index of between 2 and 150 and a viscosity less than 20 centipoises when measured as a 4% solution in water.

3. The process as claimed in claim 1, in which the ester index of the polyvinyl alcohol is less than 20.

4. The process as claimed in claim 1, in which the viscosity of the polyvinyl alcohol is between 2 and 10 centipoises when measured in 4% solution in water.

5. The process as claimed in claim 1, in which a cross-linking agent is added to the polyvinyl alcohol aqueous solution.

6. The process as claimed in claim 1, in which the coating process is carried out at a temperature between 40° and 60° C.

7. The process as claimed in claim 1, in which the polyvinyl alcohol aqueous solution is dried until there is a residual moisture content not less than 0.01%.

8. The process as claimed in claim 7, in which the drying of the polyvinyl alcohol solution on the tube or preform continues until there is a residual moisture content between 0.5 and 5% and is finished after drawing-blowing of the preform.

9. The process as claimed in claim 1, in which a post heat treatment of the coating is carried out after bidrawing at a temperature above 100° C.

10. A process as claimed in claim 9, in which the post heat treatment is carried out at a temperature within the range of 150°-240° C.

11. The process as claimed in claim 1, in which more than one coating is applied, characterized in that the final coating is composed of a polymer which is less moisture permeable than the underlying coating of polyvinyl alcohol.

12. The process as claimed in claim 11, in which the final coating is carried out with a polymer latex which is applied after partial drying of the polyvinyl alcohol.

13. The process as claimed in claim 12, in which the polymer latex is a vinylidene chloride copolymer latex, characterized in that the drying is carried out in a first zone where the temperature is between 80° and 200° C. and then in a second zone where the temperature is between 90° and 100° C.

14. The process as claimed in claim 11, in which the final coating is applied by coextrusion-coating with a melted polymer.

15. The process as claimed in claim 14, in which the melted polymer is a glycol ethylene polyterephtalate.

16. The process as claimed in claim 11, in which the final coating is applied after bidrawing-blowing on the hollow body.

17. The process as claimed in claim 11, in which the final coating is composed of a drawable or retractable polymer sleeve placed on the hollow body.

* * * * *